United States Patent [19]
Volkmann

[11] 4,237,768
[45] Dec. 9, 1980

[54] BLIND FASTENER

[75] Inventor: Josef F. Volkmann, Torrance, Calif.

[73] Assignee: Hi-Shear Corporation, Torrance, Calif.

[21] Appl. No.: 739,040

[22] Filed: Nov. 5, 1976

Related U.S. Application Data

[63] Continuation-in-part of Ser. No. 659,414, Feb. 19, 1976, abandoned.

[51] Int. Cl.³ .............................................. F16B 13/04
[52] U.S. Cl. ........................................... 85/73; 85/70
[58] Field of Search .................... 85/77, 78, 73, 74, 70, 85/71, 75

[56] References Cited

U.S. PATENT DOCUMENTS

| | | | |
|---|---|---|---|
| 2,250,343 | 7/1941 | Zigler | 85/1 JP X |
| 2,409,352 | 10/1946 | Gill | 85/70 |
| 2,516,554 | 7/1950 | Coyne | 85/73 |
| 2,787,185 | 4/1957 | Rea et al. | 85/73 |
| 2,863,351 | 12/1958 | Vaughn | 85/73 |
| 2,887,003 | 5/1959 | Brilmyer | 85/73 X |
| 2,915,934 | 12/1959 | LaTorre | 85/73 |
| 3,129,630 | 4/1964 | Wing et al. | 85/75 X |
| 3,236,143 | 2/1966 | Wing | 85/70 |
| 3,369,442 | 2/1968 | Darby et al. | 85/70 |
| 4,007,659 | 2/1977 | Stencel | 85/70 |

FOREIGN PATENT DOCUMENTS 1008995  5/1957  Fed. Rep. of Germany .............. 85/73

*Primary Examiner*—Ramon S. Britts
*Attorney, Agent, or Firm*—Donald D. Mon

[57] ABSTRACT

A blind fastener for fastening bodies together comprises a hollow tubular sleeve and a core bolt passing through the sleeve. The sleeve has a head at its front end to engage the front of the fastened bodies and the bolt has a head at its front end to engage the head of the sleeve. The sleeve has two sections, the first of which, adjacent to the sleeve head, has an internal diameter to fit over the core bolt, and the second of which, at the end of the sleeve remote from the sleeve head, has a larger internal diameter to leave an annular space between the core bolt and this second section.

The end portion of the core bolt remote from the bolt head is threaded to engage the threads of a nut. The nut has a head rearward from the sleeve, from which there protrudes a tubular shank which extends into the annular space toward the sleeve head. The nut has an outside diameter larger than that of the nut shank but no greater than that of the sleeve. A deformable collar is positioned over the nut shank between the nut head and the end of the sleeve remote from the sleeve head. This assembly of the sleeve, bolt, nut and collar is adapted to pass through aligned holes through bodies to be fastened together, so that the sleeve head is at the front side of the bodies and the nut head, collar and rear end of the sleeve are at the rear side of the fastened bodies. When the nut is drawn toward the sleeve head, which may be done by pulling it by use of a mandrel in the absence of the core bolt, the deformable collar expands over the sleeve end and advances toward the sleeve head until it meets the rear of the fastened bodies, thereby setting the fastener. In a modification, a section of the collar nearest the sleeve head is made relatively thin as compared with the remainder of the collar so that while the nut is being drawn toward the sleeve head, the thin section first deforms outwardly until it meets the rear of the fastened bodies and then turns inwardly to meet the outer circumference of the sleeve, thereby setting the fastener. After removal of the mandrel the core bolt is torqued into the nut.

19 Claims, 8 Drawing Figures

BLIND FASTENER

This is a continuation-in-part of application Ser. No. 659,414, filed Feb. 19, 1976, entitled "Blind Fastener", now abandoned.

This invention relates to blind fasteners.

A blind fastener assembly commonly comprises a bolt having a head and a threaded shank which is passed through a hollow sleeve also provided with a head and a shank. The threaded rear end of the bolt ordinarily extends beyond the shank of the sleeve and a threaded collar has usually been attached to the threaded end of the bolt. Such an assembly is ordinarily passed through registering holes of sheets or bodies which are to be fastened together, so that the collar on the bolt threads is to the rear of these bodies. When the bolt is torqued from the front or head side of these bodies, which is ordinarily the only side from which a blind fastener may be operated, the collar is pulled toward the head of the bolt and it usually produces a deformation of a part of the assembly behind the bodies to be fastened, thereby setting the blind fastener and securing the bodies tightly together.

Alternatively to setting by the torquing of a bolt, the setting has been accomplished by inserting a mandrel through the sleeve and threading it to the collar and then pulling the mandrel from the front. The setting of blind fasteners, including blind bolts, involves problems not present in the case of ordinary fasteners. Since no setting mechanism can be placed behind the fastener, as in the case of an ordinary fastening operation, the tightness and durability of the fastener is dependent upon such operations as can be performed from the front or head side. Problems inherent in the use of blind fasteners have often produced set fasteners which are weaker than desired or which have been improperly set, or set too loose. These problems, moreover, involve the risk that some such fasteners which may have appeared properly fastened initially may loosen up in service, particularly when subjected to vibration.

An object of the present invention is to provide a blind fastener assembly which is simple, strong and lightweight, easy to manufacture and install, and is substantially vibration proof.

In accordance with this invention, a hollow sleeve having a head at its front end and a shank with an external diameter dimensioned to pass through aligned holes through sheets or bodies to be fastened together, protrudes from the rear of these bodies. The length of the sleeve comprises two sections, the first of which has an internal diameter which enables it to slidably fit around a mandrel or bolt passed through the sleeve and the second of which has a greater internal diameter than that of the first section so that there is an annular space between the exterior surface of the mandrel or bolt shank and this second section. The first section lies between the sleeve head and the second section. A threaded nut having a hollow shank with internal and external diameters so dimensioned that this shank fits within the annular space, is fitted within the rear end of the sleeve. The nut head, from which the nut shank protrudes toward the bolt head and sleeve head, has a larger diameter than that of the nut shank. This allows a tubular collar to be placed over the nut shank between the nut head and the rear end of the sleeve and prevents the collar from coming off.

The collar is made of a relatively ductile, deformable material so that it can be deformed and the core bolt sleeve and nut are of a relatively hard, high strength materials so that they will not deform.

The nut and its shank are drawn toward the bolt head and sleeve head so that the nut shank advances forwardly through the annular space between the sleeve and the bolt shank. This may be done by inserting a mandrel through the sleeve, attaching it to the nut, and pulling the mandrel from the front end of the sleeve. This causes the collar to expand over the sleeve and advance forwardly to meet the rear of the fastened bodies, thereby setting the fastener. The core bolt is then threaded into the assembly securing it together.

In a modification of the invention a forward section of the collar has a wall which is substantially thinner than the wall of the remainder of the collar. When the thin section of the collar expands over the sleeve, this thin forward end upon striking the rear surface of the fastened members rolls outwardly along said rear surface and expands the forward part of the thicker section of the collar in doing so, thereby setting the fastener.

According to an optional, but preferred, feature it will usually be convenient and time-saving, to make a sub-assembly of the sleeve, nut and collar by pressing the nut shank into the rear end of the sleeve while the collar is positioned over the nut shank between the nut head and the rear end of the sleeve without deforming the collar. This sub-assembly can then quickly be inserted through the holes of the bodies to be fastened and the core bolt may be torqued into the nut after setting the fastener.

According to an optional feature it may be desirable in some instances to provide roughness or knurling on the external surface of the sleeve near its rear end to prevent relative rotation between the sleeve and the collar.

According to another optional feature, a locking device may be supplied at the screw thread of the nut, for example by deformation, or by a plastic patch lock or plug lock, or by a chemical lock, to inhibit loosening of the nut.

The foregoing and other features of the invention will be better understood from the following detailed description and the accompanying drawing of which:

Figure 1:
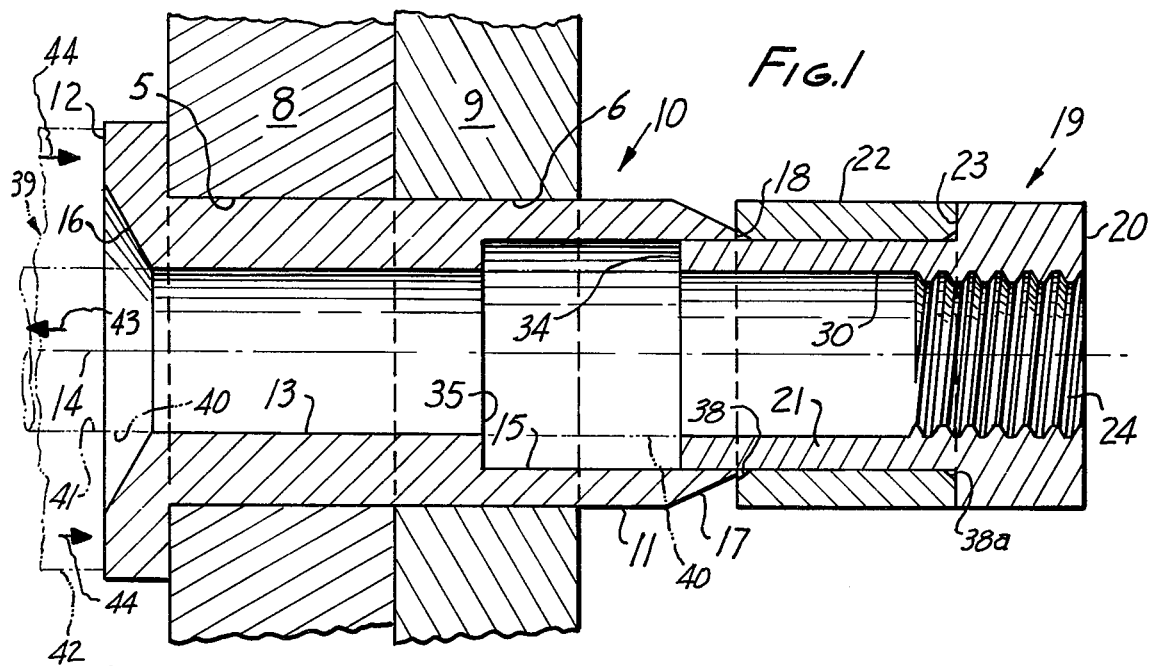
FIG. 1 shows partially in cross section a "sub-assembly" according to this invention comprising a sleeve, nut and collar for a blind fastener assembly positioned to be set by use of a mandrel to fasten together a pair of bodies.

Referring to the drawing, FIG. 1 shows a pair of sheets or bodies 8 and 9 provided with respective aligned holes through which there is passed a sleeve 10 having a cylindrical exterior 11 and a head 12 at its front end. A front section 13 protruding rearwardly from the head contains a cylindrical internal opening concentric with the axis 14 of the fastener. To the rear of section 13 there is a second section 15 having a concentric internal diameter greater than that of the first section 13. The sleeve head 12 is countersunk to form a conical opening 16 communicating at its rear with section 13 of the sleeve. The exterior cylindrical surface 11 is provided with a conical taper 17 tapering rearwardly toward the axis to a small thickness 18 at its extreme rear end. A nut 19 having a head 20, and a hollow shank 21 extending from the head, is fitted to sleeve 10 by forcing the cylindrical shank 21 into sleeve section 15 with an interference fit as shown in FIG. 1. Before inserting the nut shank into the sleeve section 15 there is placed around the outer surface of the nut shank a hollow cylindrical collar 22 which will slide over the rear end of the sleeve 10 during the setting of the fastener. The outer diameter of the nut head 20 is made greater than the outer diameter of the nut shank 21. Prior to the setting operation, one end of collar 22 abuts the nut head and the other end of collar 22 abuts against end 18 of the sleeve. Collar 22 also has an internal chamfer 38 to aid its slipping over the sleeve end during installation. Preferably the collar also has an internal chamfer 38a at its end opposite that of chamfer 38 so that either end may be abutted against the sleeve with the same effect. The nut is provided with internal threads 24 concentric with the central axis 14 of the fastener for receiving the rear end of a threaded mandrel used in a setting operation, and also for receiving the threaded end of a core bolt 25 as shown in FIG. 2.

Figure 2:
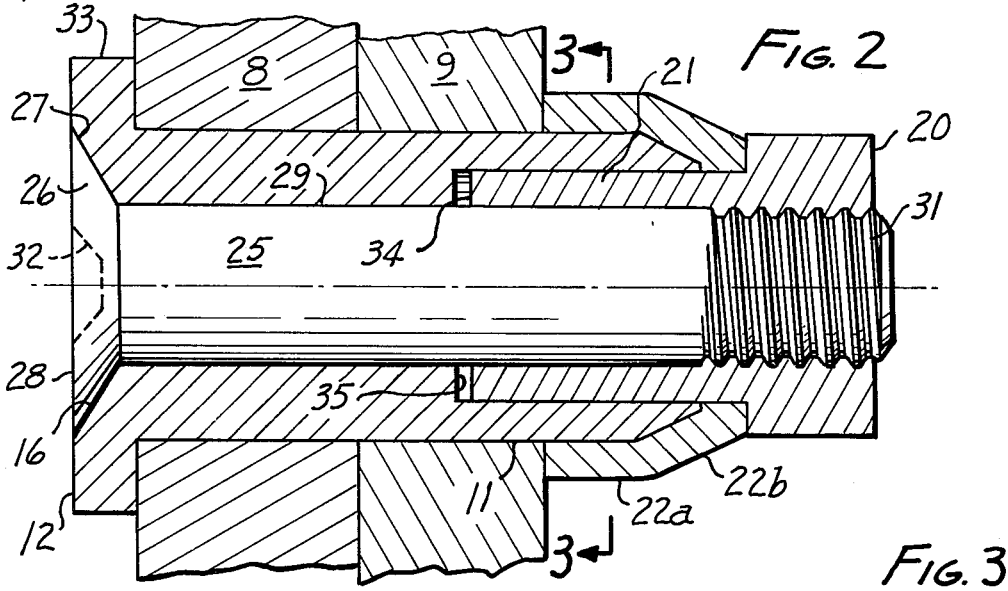
FIG. 2 shows the fastener sub-assembly of FIG. 1 after being set by an axial pulling operation and after introduction of a core bolt.

FIG. 2 shows the fastener structure of FIG. 1 after the pulling of the collar 22 over the rear end of the sleeve 10 to its position 22a, which may be done in a manner described hereinafter. FIG. 2 also shows a core bolt 25 fastened into the sleeve after the pulling operation. The core bolt 25 has a conical head 26, the conical surface 27 of which is dimensioned and proportioned to lie against conical surface 16 of the sleeve head, leaving the front face 28 the core bolt head in the same plane as the front face of the sleeve head 12 as shown in FIG. 2. The core bolt 25 has a shank with an outer cylindrical surface 29 extending rearwardly from the bolt head, the diameter of the bolt shank being the same as the internal diameter 13 of the first sleeve section while providing for a sliding fit between the core bolt shank and the sleeve. The internal cylindrical surface 30 of the nut shank has the same diameter as that of the internal surface of the sleeve section 13. Hence the core bolt also has a sliding fit with the internal surface of the nut sleeve except that threads 31 at the end of the core bolt shank engage the threads 24 of the nut as shown in FIG. 2.

It is noted that the core bolt is not shown in the assembly of the sleeve, nut and collar shown in FIG. 1, as the nut is pulled toward the sleeve as shown in FIG. 2 before the introduction of the core bolt. The nut-pulling operation may be performed by a mandrel, preferably in a tool 39 partially shown in phantom in FIG. 1. This mandrel tool is a well-known type of tool comprising a threaded mandrel 40 slidable longitudinally through an internal cylindrical bore 41 of an anvil member 42. In the fastener-setting operation the mandrel 40 is inserted through the bore of the anvil and the sleeve 10, and the mandrel threads are threaded into threads 24 of the nut. The anvil 42 is placed against the front surface of the sleeve head 12, including the outer annular part and also the conical part 16, while the mandrel head is pulled in the direction of arrow 43. While the mandrel is being pulled the anvil 42 acting as a bucking member, applies pressure in the direction of arrows 44 against the sleeve head. This action draws the nut 19 to a position as shown in FIG. 2.

When the mandrel of the installation tool is first inserted through the sleeve and threaded into threads 24 prior to axial pulling motion, the relative positions of the sleeve and collar remain as illustrated in FIG. 1. When, however the engaged mandrel is moving in an axial direction toward the sleeve head, the nut will be drawn forwardly relative to the sleeve. This advance of the nut advances the nut shank forwardly through the annular region between the sleeve section 15 and the outer cylindrical surface of the mandrel. In a minimum grip condition this motion may be continued to the limiting position where the end 34 of the nut shank abuts the shoulder 35 of the sleeve at the position between the sleeve sections 13 and 15.

In the advancement of the nut, the collar 22 is deformed to its position shown in FIG. 2 forming behind the fastened bodies a head of greater diameter than the outside diameter of the sleeve and greater than that of holes 5 and 6 through bodies 8 and 9. The reason for this is that the collar is made of a relatively ductile material or metal as compared with the harder and higher strength material of the nut, mandrel, and sleeve. As the collar 22 is pressed against the end surface 18 of the sleeve at the time of the initial axial pulling motion, the end of the collar abutting the end of the sleeve and provided with a chamfer expands outwardly so that the forward end of the collar rides over the tapered surface 17 of the sleeve and then over the cylindrical portion of the outer sleeve surface adjacent the tapered surface until this deformed end part 22a of the collar abuts against the rear of fastened body 9 while the rear deformed part 22b envelops the tapered sleeve end 17, thereby setting the fastener. The core bolt is then torqued into the thus assembled fastener, securing all components together. The core bolt should also be of relatively hard material and high strength as compared with that of the ductile collar.

In FIG. 2 the collar is illustrated as being set against body 9 while there is a small clearance between the ends 34 and 35 of the nut shank and the shoulder. This clearance allows for adjustment of different thicknesses in bodies 8 and 9 and surfaces 34 and 35 are in full contact with each other only in minimum allowable thickness in which case the collar may be buckled around the end of the sleeve somewhat more than illustrated in FIG. 2.

An optional feature which may frequently be found desirable is to provide a roughness to at least part of the outer surface 11 of the sleeve 10 just forward of the taper 17.

Figures 3, 4:
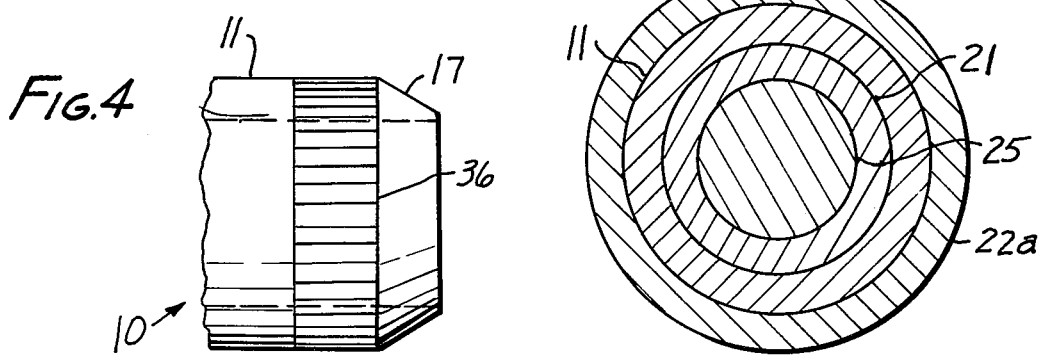
FIG. 3 is a cross section view taken at line 3—3 of FIG. 2.
FIG. 4 shows the rear end portion of a sleeve provided with knurling, which may be used in lieu of the sleeve of FIG. 1.

This is illustrated in FIG. 4 by a circumferential band 36 of knurling in the form of longitudinally extending ridges. This roughened surface or knurling will inhibit rotation of the collar after being set, as shown in FIG. 2 and thus enhance the tightness of the collar head behind the fastened bodies. It also aids in making the collar slide easier into the sleeve by reducing the contact area and thereby reducing friction.

The sleeve, nut and collar can be pre-assembled in their relative positions illustrated in FIG. 1. This can be done by pressing the nut shank into the sleeve section 15 to the extent illustrated in FIG. 1 while the collar is placed over the nut shank in the position shown in FIG. 1. This will require enough of a force fit between the outer surface of the nut shank and the inner surface of section 15 so that the assembly will hold together and will also hold the nut against turning when the bolt is being torqued through the nut. The force required for this pre-assembly should, however, not be so great as to inhibit the forward advance of the nut shank through the sleeve during the pulling-in operation which buckles the collar around the sleeve end to set the fastener. Such a pre-assembly has a great advantage in a fastening operation as it is only necessary to insert the nut end of this pre-assembly through the aligned holes of the bodies to be fastened as illustrated in FIG. 1, set the collar and nut, and then insert the core bolt through sleeve 10 and thread it into the nut as illustrated in FIG. 2.

FIGS. 5, 6, 7 and 8 show a modification of the invention in which the collar 40 instead of having a wall of uniform thickness throughout its axial length as in the case of collar 22 of FIG. 1, has a relatively thin forward section 40a and a relatively thick rear section 40b. This difference in thickness of these two collar sections results in the fact that the outer cylindrical surface of the collar is uniform in diameter, while the inner cylindrical surface of section 40b is of smaller diameter than the inner cylindrical surface of 40a. At the junction between the inner cylindrical surfaces of the two sections the transition is in the form of a conical surface 40c. The sleeve 41 is similar to the sleeve 10 of FIG. 1, although the abrupt shoulder 35 in FIG. 1 is in the form of a conical transition 42 seen in FIG. 5. Elements in FIGS. 5-8 which are similar to those in FIGS. 1-4 are identified by the same numbers.

Figure 7:
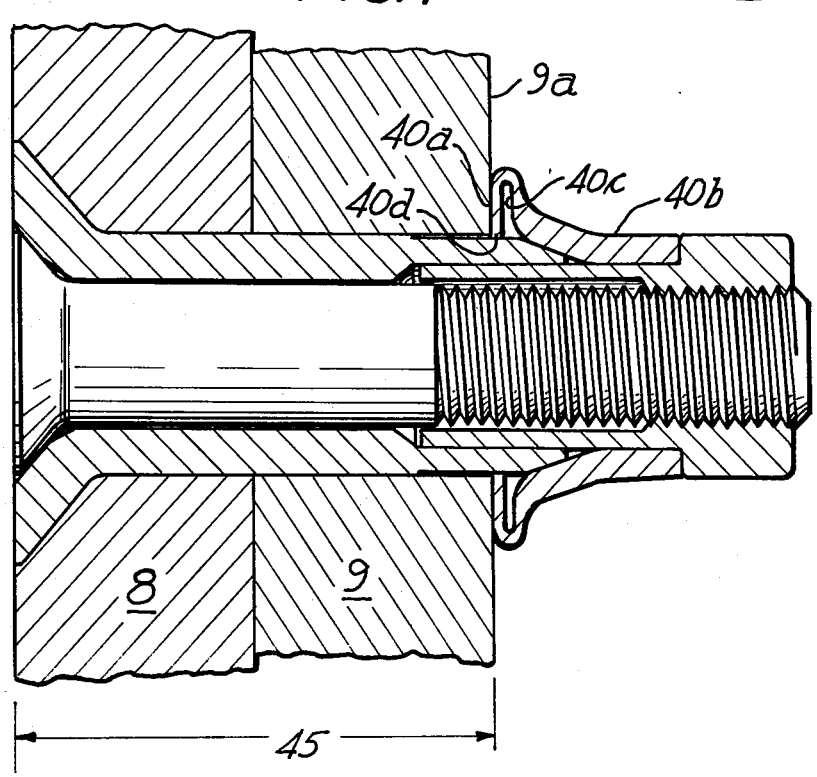
FIG. 7 shows the fastener sub-assembly of FIG. 5 after being set against fastened members by an axial pulling operation and after introduction of a core bolt.

When the nut 19 is pulled toward the head of the sleeve by the mandrel, as explained hereinabove, the thin section 40a of the collar slides along the bevel 17 of the sleeve and bulges outwardly since the collar is of ductile deformable material as explained hereinabove. This sliding produces a frictional skin effect at the inner surface of section 40a causing some flow of the material at the skin so as the forward end of section 40a clears the bevel 17 it curls inward toward the central axis. Hence when this forward edge 40d reaches the rear surface 9a of fastened member 9 it curls further inward along surface 9a until it reaches the outer surface of the sleeve. As the nut continues to advance forwardly due to continued pulling by the mandrel, this thin section rolls outward along surface 9a thereby warping the forward end of collar section 40b outwardly until most of the thin section of 40a lies along the surface of fastened member 9a as shown in FIG. 7. This is the set position of the fastener. It is preferred that the outer sleeve surface be roughened or knurled at 36 for the same reason as in FIGS. 1-4.

Figure 5:
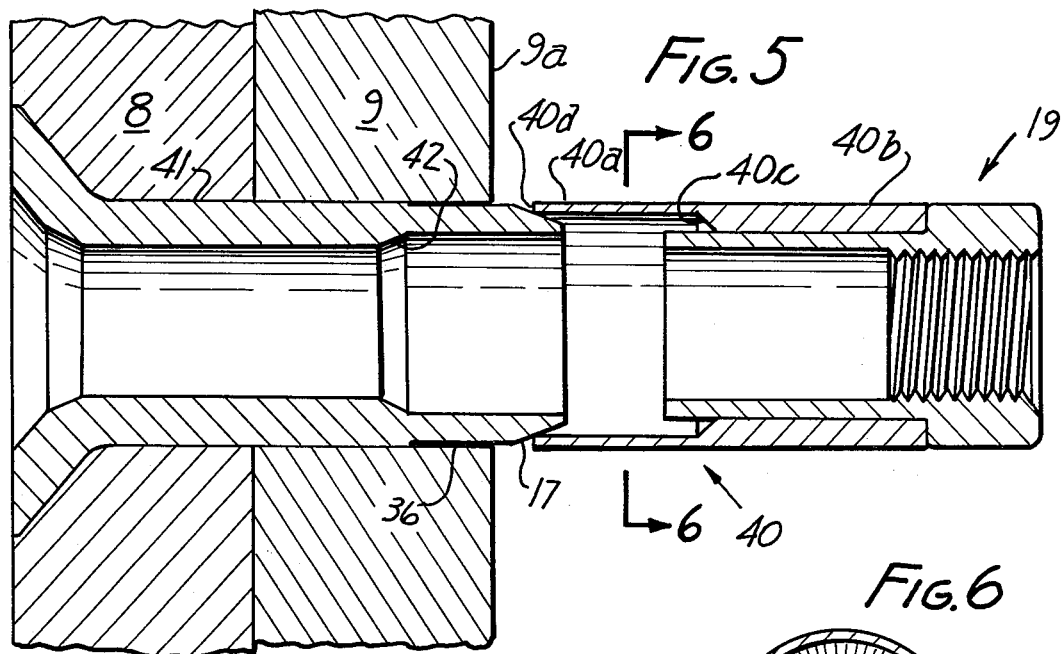
FIG. 5 shows in cross section a "sub-assembly" comprising a sleeve, nut and collar for a blind fastener assembly according to this invention in which the collar is modified from that shown in FIGS. 1 and 2.
Figure 6:
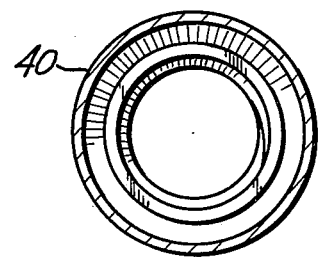
FIG. 6 is a cross section view taken at line 6—6 of FIG. 5.

It is noted that the dimension 45 in FIG. 7 represents the greatest thickness of fastened members which can properly or desirably be fastened with the use of a sleeve having a length as shown in FIGS. 5 and 7, as this is the greatest thickness which will enable the edge 40d of the thin section of the collar to clear the beveled part of the sleeve. Hence this may be termed the maximum grip of the fastener.

Figure 8:
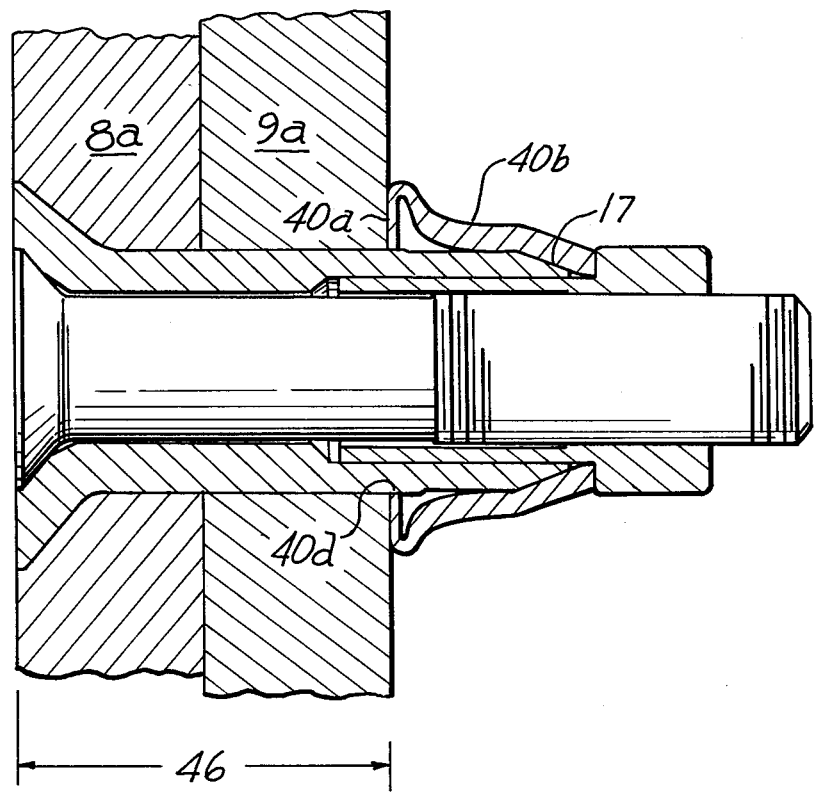
FIG. 8 shows the fastener assembly of FIG. 5 after being set against fastened members which are thinner than those in FIG. 7.

The same fastener may, however, be used to fasten members having a lesser thickness than that shown in FIGS. 5 and 7. FIG. 8 illustrates the fastener set against fastened members 8a and 9a having a minimum desirable thickness indicated by dimension 46 in FIG. 8. This minimum proper or desirable grip is that at which the thick section 40b of the collar just establishes contact with the bevel 17 as the mandrel is pulled forwardly. If the nut were pulled further from this desirable minimum grip, the effect could be to bulge the thick section out far enough so that the forward edge 40d of the thin section would lose contact with the outer surface of the sleeve, and this could result in a less secure setting of the fastener than when the edge 40d is maintained in firm engagement with the sleeve.

It is seen that the set collar 40 (FIGS. 7 and 8) provides a greater bearing area against fastened member 9 or 9a than does the set collar of FIG. 2. This greater bearing area results in a decrease of compressive stress at the fastened member for a given tensile load on the sleeve. This can be of substantial importance especially where the material of the fastened members is susceptible to damage, for example, graphite/epoxy composite material.

It will be recognized that by this invention there is provided a blind rivet assembly which is relatively easy to assemble and permits the formation of a pre-assembly which can conveniently be inserted through bodies to be fastened and then set by pulling on a mandrel and then torquing of a core bolt. Furthermore a fastener thus set is capable of maintaining its tightness.

It will often be desirable to provide some form of locking device or expedient at the screw thread of the nut. Any of a number of well-known expedients may be employed for this purpose, for example, deformation of the screw thread, or a plastic patch lock or a plug lock, or a chemical lock. All of these are well-known expedients needing no further explanation here.

Although the preferred manner of pulling the nut to set the fastener involves use of a mandrel, as described hereinabove, it may be possible in some instances to pull the nut by other means such as a threaded bolt torqued into the nut to draw the nut furwardly.

Although the core bolt is shown as having a countersunk head it will be understood that the core bolt may, if desired, have a head which extends forwardly from the sleeve head.

This invention is not to be limited by the embodiments shown in the drawings and described in the description, which are given by way of example and not of limitation, but only in accordance with the scope of the appended claims.

I claim:

1. A blind fastener pre-assembly comprising: a hollow tubular sleeve having a head and having a first section and a second section; the first section having a smaller internal diameter than that of the second section and being disposed between the head and the second section;

a nut having a head and a tubular shank protruding forwardly from the nut head, a forward part of the nut shank being fitted within a rear part of said second section of the sleeve;

a metallic tubular collar more deformable and ductile than the nut and sleeve, positioned around the nut shank between the nut head and the rear end of the second sleeve section, said collar being expandable and slidable forwardly over the rear end of the second sleeve section;

whereby when the pre-assembly is passed through bodies to be fastened, with the sleeve head at the front side of said bodies, and the rear end of the sleeve at the rear side of said bodies, the nut can be pulled toward the sleeve head so that a portion of the collar expands and slides forwardly over the second sleeve section and abuts the rear of the bodies, and a core bolt may be passed through the sleeve and torque into the nut to secure the fastener.

2. A pre-assembly according to claim 1 in which an exterior surface of the rear part of said second sleeve section tapers rearwardly to the rear end of the sleeve toward the central axis of the fastener, thereby facilitating the expansion and forward sliding of the collar.

3. A pre-assembly according to claim 1 in which there is a shoulder at the junction of the inneer surfaces of the first and second sleeve sections, against which the forward end of the nut shank can abut to limit the forward advance of the nut.

4. A pre-assembly according to claim 1 in which the greatest diameters of the nut head and of the collar prior to the pulling of the nut, are no greater than the exterior diameter of the sleeve.

5. A pre-assembly according to claim 4 in which the external diameters of the sleeve, the nut head, and the collar prior to the pulling of the nut, are all the same.

6. A pre-assembly according to claim 5 in which the greatest diameter of the sleeve head is greater than the exterior diameter of the sleeve.

7. A pre-assembly according to claim 2 in which the internal surface at the end of the collar adjacent the rear end of the sleeve is chamfered.

8. A pre-assembly according to claim 2 in which the exterior surface of the sleeve at a region adjacent to the taper is knurled.

9. A blind fastener assembly set to fasten bodies, comprising:
a pre-assembly according to claim 2 in which the preassembly is passed through the bodies with the sleeve head at the front side of the bodies and the rear end of the sleeve at the rear side of the bodies, and the collar is expanded over the second sleeve section and abuts the rear of the bodies at one end of the collar and abuts the nut head at the other end of the collar;
said blind fastener assembly including a core bolt having a head which engages the head of the sleeve and has a threaded shank passing through the tubular sleeve and closely fitting the internal surface of the first sleeve section and leaving an annular space between the bolt shank and the second sleeve section into which the nut shank extends;
said bolt shank threads engaging the nut threads, and thereby interlocking the assembly in a secure manner.

10. A blind fastener assembly set to fasten bodies, comprising:
a pre-assembly according to claim 3 in which the pre-assembly is passed through the bodies with the sleeve head at the front side of the bodies and the rear end of the sleeve at the rear side of the bodies, and the collar is expanded over the second sleeve section and abuts the rear of the bodies at one end of the collar and abuts the nut head at the other end of the collar;
said blind fastener assembly including a core bolt having a head which engages the head of the sleeve and has a threaded shank passing through the tubular sleeve and closely fitting the internal surface of the first sleeve section and leaving an annular space between the bolt shank and the second sleeve section into which the nut shank extends;
said bolt shank threads engaging the nut threads, and thereby interlocking the assembly in a secure manner.

11. A blind fastener assembly set to fasten bodies, comprising:
a pre-assembly according to claim 4 in which the pre-assembly is passed through the bodies with the sleeve head at the front side of the bodies and the rear end of the sleeve at the rear side of the bodies, and the collar is stretched over the second sleeve section and abuts the rear of the bodies at one end of the collar and abuts the nut head at the other end of the collar;
said blind fastener assembly including a core bolt having a head which engages the head of the sleeve and has a threaded shank passing through the tubular sleeve aand closely fitting the internal surface of the first sleeve section and leaving an annular space between the bolt shank and the second sleeve section into which the nut shank extends;
said bolt shank threads engaging the nut threads, and thereby interlocking the assembly in a secure manner.

12. A blind fastener assembly set to fasten bodies, comprising:
a pre-assembly according to claim 5 in which the pre-assembly is passed through the bodies with the sleeve head at the front side of the bodies and the rear end of the sleeve at the rear side of the bodies, and the collar is stretched over the second sleeve section and abuts the rear of the bodies at one end of the collar and abuts the nut head at the other end of the collar;
said blind fastener assembly including a core bolt having a head which engages the head of the sleeve and has a threaded shank passing through the tubular sleeve and closely fitting the internal surface of the first sleeve section and leaving an annular space between the bolt shank and the second sleeve section into which the nut shank extends;
said bolt shank threads engaging the nut threads, and thereby interlocking the assembly in a secure manner.

13. A blind fastener assembly set to fasten bodies, comprising:
a pre-assembly according to claim 6 in which the pre-assembly is passed through the bodies with the sleeve head at the front side of the bodies and the rear end of the sleeve at the rear side of the bodies, and the collar is stretched over the second sleeve section and abuts the rear of the bodies at one end of the collar and abuts the nut head at the other end of the collar;
said blind fastener assembly including a core bolt having a head which engages the head of the sleeve and has a threaded shank passing through the tubular sleeve and closely fitting the internal surface of the first sleeve section and leaving an annular space between the bolt shank and the second sleeve section into which the nut shank extends;

said bolt shank threads engaging the nut threads, and thereby interlocking the assembly in a secure manner.

14. A blind fastener assembly set to fasten bodies, comprising:
- a pre-assembly according to claim 7 in which the pre-assembly is passed through the bodies with the sleeve head at the front side of the bodies and the rear end of the sleeve at the rear side of the bodies, and the collar is stretched over the second sleeve section and abuts the rear of the bodies at one end of the collar and abuts the nut head at the other end of the collar;
- said blind fastener assembly including a core bolt having a head which engages the head of the sleeve and has a threaded shank passing through the tubular sleeve and closely fitting the internal surface of the first sleeve section and leaving an annular space between the bolt shank and the second sleeve section into which the nut shank extends;
- said bolt shank threads engaging the nut threads; and thereby interlocking the assembly in a secure manner.

15. A blind fastener assembly set to fasten bodies, comprising:
- a pre-assembly according to claim 8 in which the pre-assembly is passed through the bodies with the sleeve head at the front side of the bodies and the rear end of the sleeve at the rear side of the bodies, and the collar is stretched over the second sleeve section and abuts the rear of the bodies at one end of the collar and abuts the nut head at the other end of the collar;
- said blind fastener assembly including a core volt having a head which engages the head of the sleeve and has a threaded shank passing through the tubular sleeve and closely fitting the internal surface of the first sleeve section and leaving an annular space between the bolt shank and the second sleeve section into which the nut shank extends;
- said bolt shank threads engaging the nut threads; and thereby interlocking the assembly in a secure manner.

16. A pre-assembly according to claim 2 in which the collar has a forward section and a rear section and the forward collar section is thinner than the rear collar section and is thin enough so that when the forward collar section stretches over the taper at the rear end of the sleeve, the skin of the internal surface at the forward end of the forward collar section is caused to flow, thereby causing the said forward end to curl inwardly toward the sleeve after passing the taper, whereby at least a substantial part of the forward collar section lies flat against the rear surface of the bodies.

17. A blind fastener assembly set to fasten bodies, comprising:
- a pre-assembly according to claim 16 in which the pre-assembly is passed through the bodies with the sleeve head at the front side of the bodies and the rear end of the sleeve at the rear side of the bodies, and the collar is stretched over the second sleeve section so that said forward collar section has an outward roll and an inward curl which lies along the rear surface of said bodies;
- said blind fastener assembly including a core bolt having a head which engages the head of the sleeve and has a threaded shank passing through the tubular sleeve and closely fitting the internal surface of the first sleeve section and leaving an annular space between the bolt shank and the second sleeve section into which the nut shank extends;
- said bolt shank threads engaging the nut threads, and thereby interlocking the assembly in a secure manner.

18. A blind fastener assembly according to claim 17 in which the forward end of said forward collar section abuts the outer surface of the sleeve.

19. A blind fastener assembly according to claim 17 in which said rear collar section bulges outwardly from the nut and the sleeve to form the outward roll and inward curl.

* * * * *